Nov. 4, 1969     D. F. KNIGHT     3,477,017

TRANSDUCER EXCITATION CIRCUITS

Filed Jan. 9, 1967

INVENTOR
DOUGLAS FRANK KNIGHT

By: Norris + Bateman, Attys

United States Patent Office 3,477,017
Patented Nov. 4, 1969

3,477,017
TRANSDUCER EXCITATION CIRCUITS
Douglas Frank Knight, Birmingham, Warwick, England, assignor to W. & T. Avery Limited, Birmingham, Warwick, England, a British company
Filed Jan. 9, 1967, Ser. No. 608,177
Int. Cl. H02p *13/10;* H02m *5/12*
U.S. Cl. 323—51                    4 Claims

ABSTRACT OF THE DISCLOSURE

An excitation circuit for a variable reluctance transducer and supplying the transducer excitation coil with current approximately in quadrature with a reference supply voltage.

---

This invention relates to excitation circuits for transducers, and is particularly concerned with variable reluctance transducers which may be of the linear or rotary type and which convert linear or angular displacements respectively to corresponding electrical signals.

The term "variable reluctance transducer" as used in this specification refers to all transducers of the type in which an element in a magnetic circuit is caused to move by a mechanical input so as to change or reorientate flux produced in said circuits by primary A.C. excitation, one or more secondary coils converting the changed or reoriented flux to an electrical output signal indicative of the mechanical input. Among transducers of this type are those known as "A.C. inductive pickoffs" and "differential transformers."

It is an object of the invention to employ a variable reluctance transducer so that its output signal voltage is approximately in phase or 180° out of phase with a reference voltage.

In accordance with the invention a variable reluctance transducer is provided with an excitation circuit connected to the transducer excitation coil, the excitation circuit having such characteristics as to supply the transducer excitation coil with current approximately in quadrature with the supply voltage to the excitation circuit constituting a reference voltage.

Preferably means are provided for adjusting the phase relationship between the current supplied to the transducer excitation coil and the reference supply voltage.

The excitation circuit may comprise an inductance/resistance T network or a resistance/capacitance network.

Figure 1:
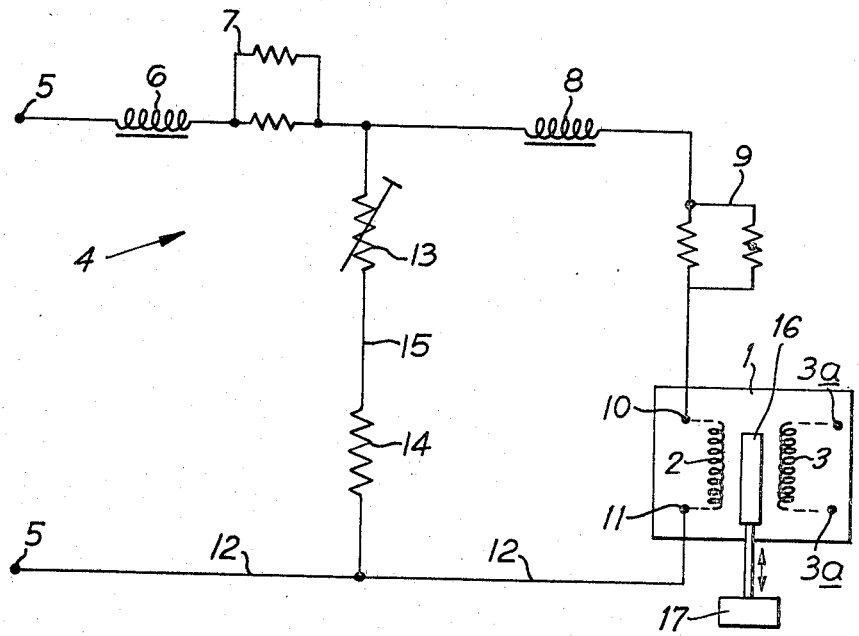
Figure 2:
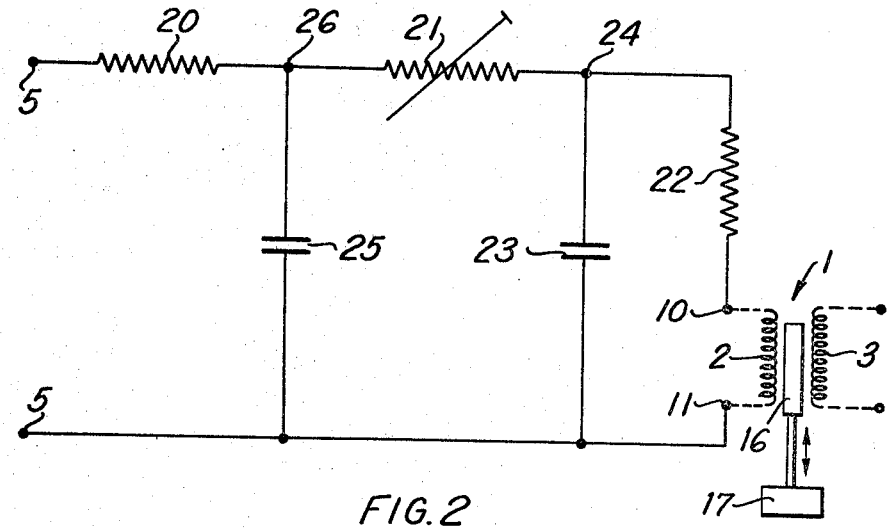

A typical example of the practical realization of the invention will now be described with reference to the accompanying drawings. FIGURE 1 is a schematic diagram of the device comprising an inductance/resistance network. FIGURE 2 exhibits a resistance/capacitance network embodiment.

Referring to FIGURE 1 of the drawing a variable reluctance transducer 1 comprises an excitation coil 2 and a secondary coil 3 coupled together through a magnetic circuit. The magnetic circuit includes a part 16 displaceable as by an operator 17 from the exterior of the transducer 1 to alter the characteristics of the magnetic circuit. Thus when the excitation coil 2 is energised the displacement of the part may be measured by means of the effect of said change in the magnetic circuit on the voltage induced in the secondary coil 3, this induced voltage being tapped at terminals 3a.

An excitation circuit 4 connects the excitation coil 2 to a carrier frequency voltage supply applied across terminals 5, which is conveniently 100 volts at 50 cycles/second.

The excitation circuit 4 comprises a first inductance coil 6 with an inductance of about 5 henrys and a resistance of about 60 ohms, a first temperature responsive resistance 7, a second inductance coil 8 similar to the first and a second temperature responsive resistance 9 connected in series with one another and constituting a supply line connected between one terminal 5 and one terminal 10 of the excitation coil 2. The other terminal 11 of the excitation coil is connected to the other supply terminal 5 through a neutral return line 12. Two resistors 13 and 14 in series, of which one 13 is variable between 0–25,000 ohms and the other 14 is fixed at 5,000 ohms, are connected into the excitation circuit 4 between the return line 12 and the supply line intermediate of the first temperature responsive resistance 7 and the second inductance coil 8. The inductance coils 6 and 8 are so chosen, as given by example above, that the value of their combined reactances at the desired frequency of 50 cycles/second is in the region of ten times the value of the combined resistances of said coils 6 and 8, the temperature responsive resistances 7 and 9 and the excitation coil 2. Consequently, with the resistance of the resistance leg 15 of the circuit 4 at infinity, it is found that the excitation circuit 4 produces a phase shift of approximately 85° between the current through the excitation coil 2 and voltage supply to the excitation circuit 4 at terminals 5. As the resistance of the resistance leg 15 is reduced to an optimum value as represented by the resistors 13 and 14 a phase shift of exactly 90° can be produced, and this shift is adjustable by means of the variable resistor 13.

The result of the aforesaid phase shift, i.e. the excitation coil current and supply voltage being in quadrature, is that the inductance of the excitation coil 2 is effectively infinite whereby the output signal of the transducer 1 is in phase or 180° out of phase with the supply carrier frequency voltage.

Further, the temperature responsive resistances 7 and 9 compensate automatically for changes in the values of the other resistances at different temperatures, and the inductance coils 6 and 8 tend to filter out harmonics from the carrier frequency supply. Furthermore, it will be found that the frequency characteristics of the excitation circuit 4 tend to equalise those of the transducer 1 to provide the same harmonic content in the output of the transducer 1 as is in the supply voltage. This has the advantage that the transducer output signal voltage can be compared directly with the supply carrier frequency voltage to give a measure of the displacement affecting the output signal, and that a variety of different supply voltage waveforms can be employed.

In an alternative example shown in FIGURE 2, the above described inductance/resistance T network is replaced by a resistance/capacitance network to produce the required phase relationship between the excitation coil current and the supply voltage. In this alternative example the supply line from one input terminal 5 to terminal 10 of the excitation coil 2 of the transducer 1 comprises resistances 20, 21, and 22 in series, with the intermediate resistance 21 being variable. Each connection between two of the resistances is connected through a capacitance with the neutral return line from coil 2, e.g., a first capacitance 23 extends from connection point 24 to the neutral line and a second capacitance 25 extends from connection point 26 to the neutral line.

I claim:
1. In combination with a variable reluctance transducer comprising an excitation coil and a secondary coil, coupled together through a magnetic circuit which includes displaceable means for altering the characteristics of said magnetic circuit, a transducer excitation circuit comprising a pair of input terminals for connection to a reference voltage supply source, a pair of output terminals connected to said excitation coil, and a supply network connected between said input and output terminals and supplying current to said excitation coil approximately in quadrature with the reference supply voltage irrespective of the ratio of the reactance of said excitation coil to its resistance at the reference supply frequency, said supply network comprising first and second inductance and resistance sets serially connected with one another and with said transducer excitation coil across said input terminals, and variable resistance means connected across said input terminals in parallel with the said second of said inductance and resistance sets and said transducer excitation coil, said variable resistance means permitting adjustment of the phase relationship between the current supplied to said excitation coil and the reference supply voltage.

2. The combination of claim 1, wherein at least one resistance of said sets is a temperature responsive resistance.

3. In combination with a variable reluctance transducer comprising an excitation coil and a secondary coil coupled together through a magnetic circuit which includes displaceable means for altering the characteristics of said magnetic circuit, a transducer excitation circuit comprising a pair of input terminals for connection to a reference voltage supply source, a pair of output terminals connected to said excitation coil, and a supply network connected between said input and output terminals and supplying current to said excitation coil approximately in quadrature with the reference supply voltage irrespective of the ratio of the reactance of said excitation coil to its resistance at the reference supply frequency, said supply network comprising first, second and third resistance means serially connected with one another and with said excitation coil across said input terminals, first capacitance means connected across said input terminals in parallel with said third resistance means and said excitation coil, and second capacitance means connected across said input terminals in parallel with said second resistance means and said first capacitance means, said second resistance means being variable to permit adjustment of the phase relationship between the current supplied to said excitation coil and the reference supply voltage.

4. The combination of claim 3, wherein at least one of said resistance means is a temperature responsive resistance.

References Cited

UNITED STATES PATENTS

| | | | |
|---|---|---|---|
| 3,384,884 | 5/1968 | Var | 323—51 |
| 2,411,423 | 11/1946 | Guptill | 323—126 X |
| 2,967,993 | 1/1961 | Eckerle et al. | 323—125 X |
| 3,041,527 | 6/1962 | Cook | 323—61 X |
| 3,239,750 | 3/1966 | Weber | 323—61 |

JOHN F. COUCH, Primary Examiner

G. GOLDBERG, Assistant Examiner

U.S. Cl. X.R.

323—61, 68, 122, 126